Sept. 20, 1971  G. IRWIN  3,605,595
CARTRIDGE TYPE CAMERA CONSTRUCTION
Filed April 17, 1969  2 Sheets-Sheet 1
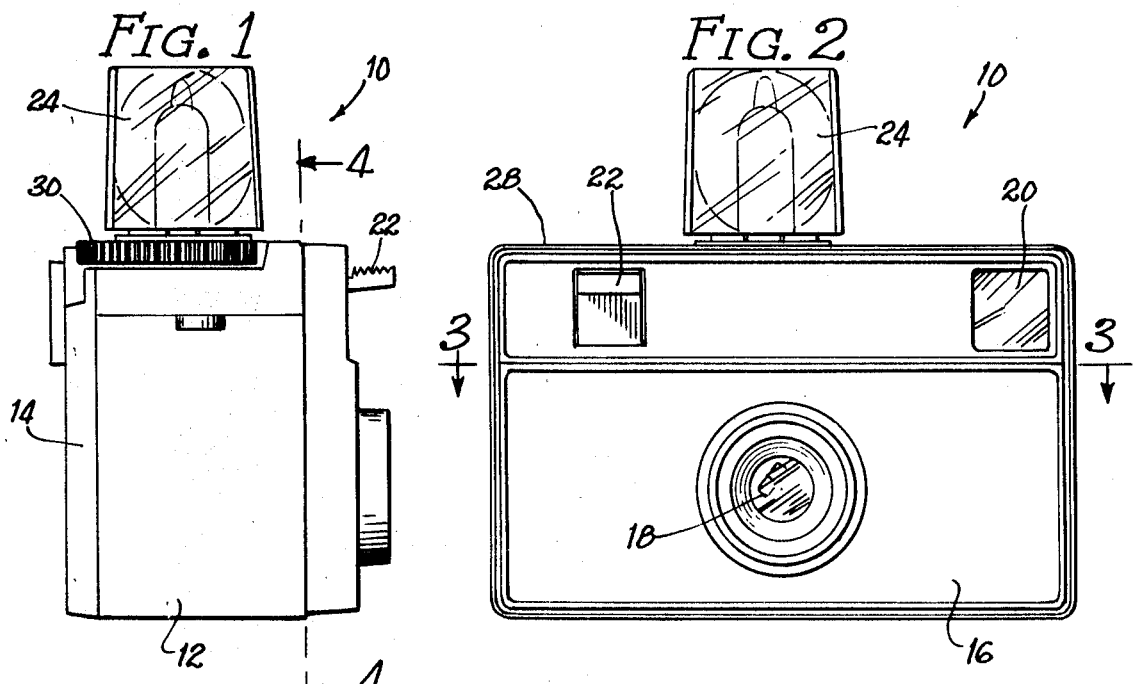
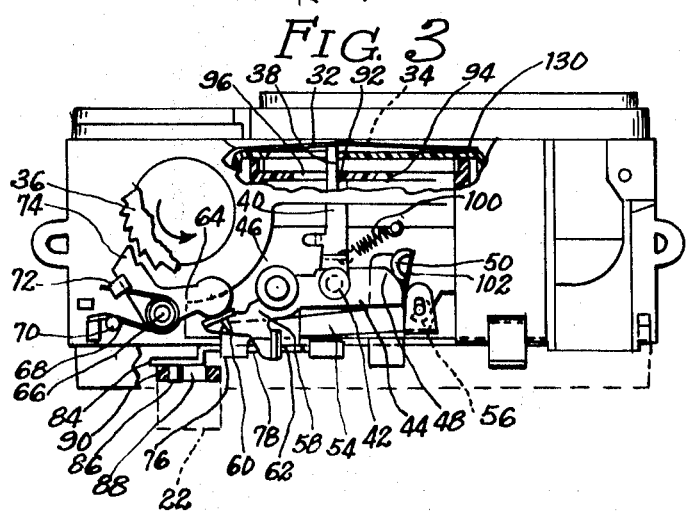
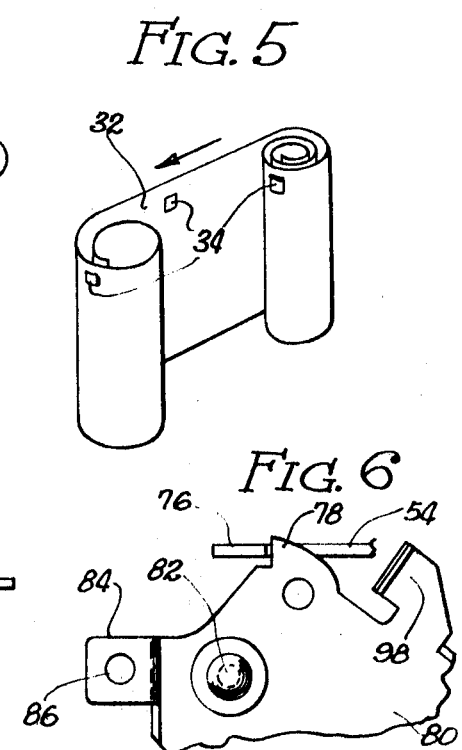
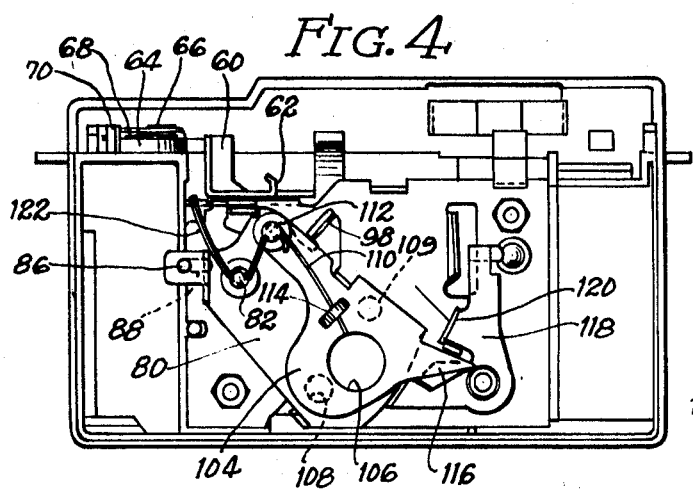
INVENTOR
George Irwin
by McDougall, Hersh, Scott and Ladd
Att'ys Sept. 20, 1971        G. IRWIN        3,605,595
CARTRIDGE TYPE CAMERA CONSTRUCTION
Filed April 17, 1969        2 Sheets-Sheet 2
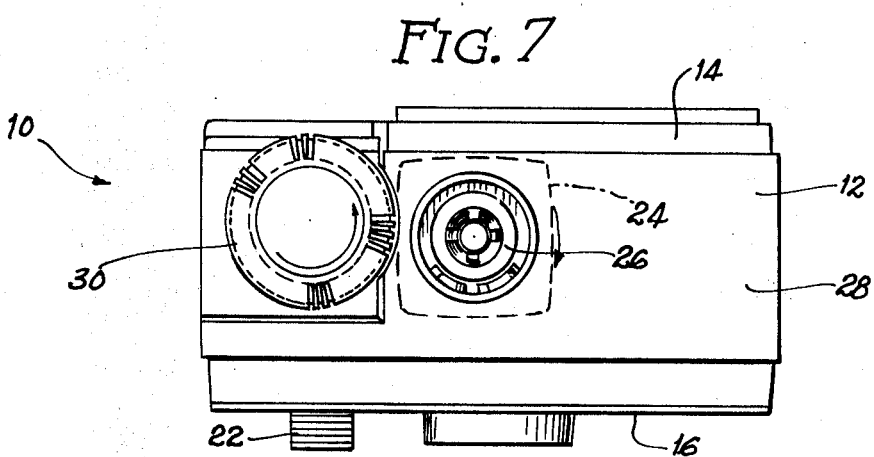
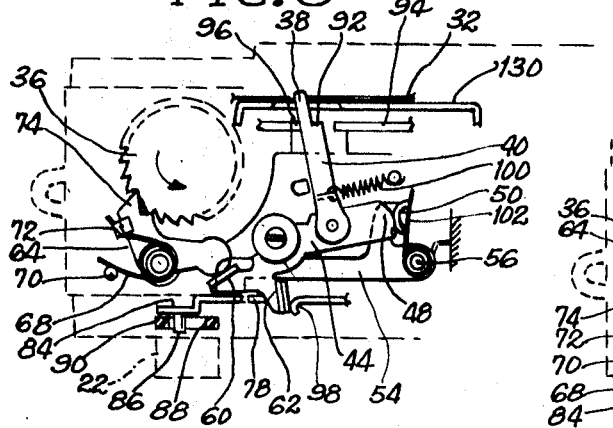
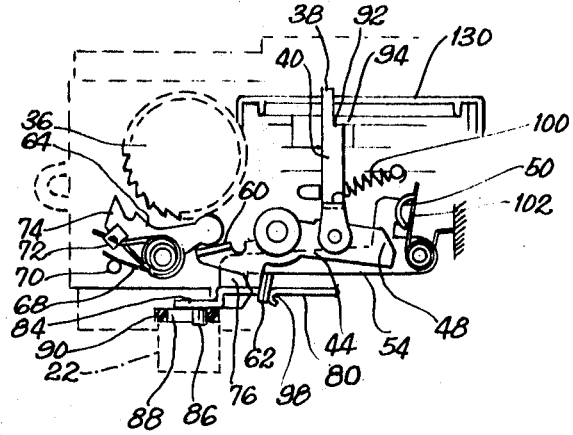
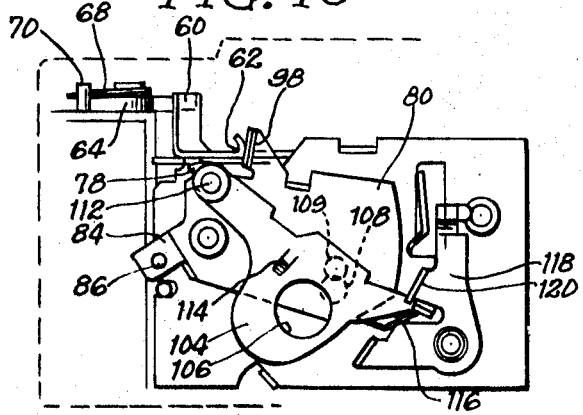
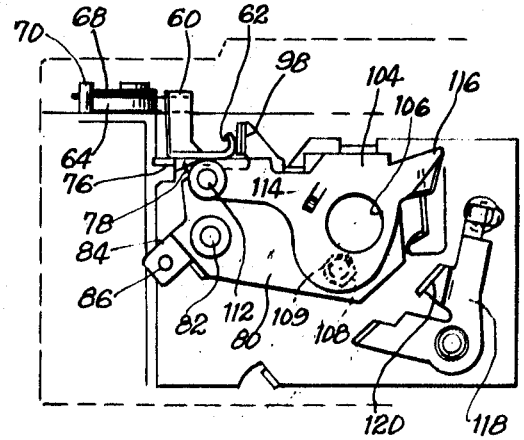
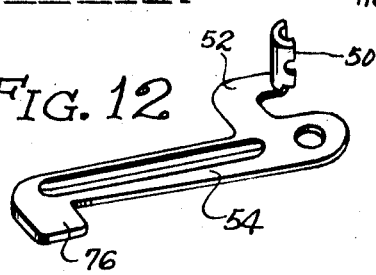

United States Patent Office 3,605,595
Patented Sept. 20, 1971

3,605,595
CARTRIDGE TYPE CAMERA CONSTRUCTION
George Irwin, Highland Park, Ill., assignor to Imperial Camera Corp., Chicago, Ill.
Filed Apr. 17, 1969, Ser. No. 816,951
Int. Cl. G03b *1/14, 1/62, 15/04, 17/42*
U.S. Cl. 95—31FM
8 Claims

ABSTRACT OF THE DISCLOSURE

A camera construction of the type employing film usually contained in a cartridge and having perforations along its length for providing frame-by-frame indexing. The sensing finger is provided for engagement with the respective perforations, and upon engagement, the film winding means is locked. The camera shutter is unlocked to permit taking of a picture, and the picture taking action operates to disengage the finger from a film perforation to provide for indexing movement. The shutter actuating member is directly tied to a first pivoting member which moves a second pivoting member, the latter directly controlling both the finger and film advance locking means so that the movements of these elements are directly dependent upon each other.

---

This invention is directed to camera constructions employed for taking pictures with film normally carried in a cartridge. The film is provided with perforations located in accordance with the number of frames to be taken in a particular roll. The camera constructions employed with such film usually include fingers for engaging the perforations so that the operator will know when the film is in position for taking a picture.

Nerwin Pat. No. 3,138,081, issued on June 23, 1964, illustrates a construction comprising a roll film magazine wherein a length of film is located within a magazine body. One end of the film is attached to a spool at one side of the magazine while a supply roll of film is located at the other side of the magazine. An opening is defined by the back of the magazine whereby movement of the film will provide for exposure through this opening. When the film is associated with a camera adapted to rotate the spool, the pictures can be taken.

A camera adapted to be used in conjunction with the magazine is disclosed in Harvey Pat. No. 3,138,084. This camera is provided with a sensing finger which is adapted to engage the surface of the film in the cartridge. Perforations are defined by the film, and these perforations are spaced at intervals which correspond to a frame of the film. The sensing finger is adapted to successively engage these perforations as the film is moved in the camera. Engagement of a perforation by the sensing means will impede further movement of the film whereby the user of the camera can automatically determine when the film is in a position for taking the next picture. In the Harvey construction, a separate button is provided on the camera for disengaging the sensing finger to permit further movement of the film.

It is a general object of this invention to provide improvements in camera constructions which operate in accordance with the general principles of the prior art constructions referred to.

It is a more specific object of this invention to provide a camera construction which includes greatly simplified operating elements so that the expense of manufacturing the construction, from the standpoint of assembly time and cost of parts, can be reduced, and so that a more reliable operating arrangement can be obtained.

These and other objects of this invention will appear hereinafter and for purposes of illustration, but not of limitation, a specific embodiment of the invention is shown in the accompanying drawings in which:

FIG. 1 is a side elevation of the construction of the invention;
FIG. 2 is a front elevation of the construction;
FIG. 3 is a horizontal, sectional view taken about the line 3—3 of FIG. 2;
FIG. 4 is a vertical sectional view taken about the line 4—4 of FIG. 1;
FIG. 5 is a perspective view illustrating film of the type utilized in conjunction with cameras of the type described;
FIG. 6 is an enlarged fragmentary view illustrating one actuating element in the system;
FIG. 7 is a plan view of the camera construction;
FIG. 8 is a detail view of the operating elements viewed from above and illustrating the element position immediately prior to shutter actuation;
FIG. 9 is a detail view of the operating elements viewed from above and illustrating the element positions immediately after shutter actuation;
FIG. 10 is a detail view of the operating elements viewed from the front and illustrating an intermediate position of the shutter actuating means;
FIG. 11 is a detail view of the operating elements illustrating the position of the elements in the extreme downward stroke of the shutter actuating means; and,
FIG. 12 is an enlarged perspective view of a locking element.

This invention is concerned with camera constructions which include various conventional elements comprising the housing with associated lens, a shutter and shutter actuating means, and preferably a flash bulb arrangement. As indicated, the film utilized in the construction is preferably of the type loaded in a cartridge.

The film employed is provided with perforations along its length with the perforations being spaced at intervals. The particular film employed in the camera need not be of the specific type disclosed in the aforementioned Nerwin patent; however, the concepts of the invention are applicable to film which is provided with perforations suitable for receiving a sensing finger which operates in the manner to be described.

The specific improvements of the invention relate to the simplicity and reliability of the operating elements employed for sensing the frame position and for locking the film winding wheel against rotation until a picture has been taken. The operating elements essentially comprise a pivotally mounted camming element directly attached to the sensing finger. Pivoting movement of this element serves to control a dog associated with a film winding ratchet while also controlling a locking element which locks and unlocks the shutter lever plate.

FIGS. 1, 2 and 7 illustrate a camera construction 10 incorporating the subject matter of this invention. The construction comprises a housing 12 and a removable back wall 14. The front wall 16 of the housing defines a centrally located lens opening 18. A viewing window 20 is located at one corner of the construction, and a shutter actuating button 22 extends outwardly from the front wall on the other side of the construction.

A flash bulb 24 is located in a socket 26 positioned in the top wall 28. A cube type bulb for multiple firing is shown; however, the socket could also be designed for receiving individual bulbs.

A film advancing wheel 30 is also situated on the top wall 28. Film 32 of the type employed in the construction is shown in FIG. 5. The film defines perforations 34 which are located at intervals corresponding with the frame portions of the film. Usually, film of this type is mounted in a cartridge as explained in the aforementioned patents.

The film advancing wheel 30 is tied to a ratchet 36 located immediately beneatth the top wall 28. The ratchet in turn defines means for engaging the spool provided for the film in a conventional manner. In the operation of the costruction, the film is inserted in the camera and the back wall is replaced. The film advancing wheel 30 is then operated until the first frame of the film is in position for taking a picture.

The operating elements within the camera include a finger 38 which is integral with the arm 40. The finger normally engages the emulsion side of the film 32 in line with the perforations 34. When the finger is in engagement with the film in the manner shown in FIG. 3, then the advancing wheel 30 is free to rotate.

The arm 40 carrying the finger 38 is pivotally connected at 42 to a camming element 44. This element is pivotally attached at 46 to the camera housing. The arm 48 of the camming element bears against the upstanding member 50 mounted on the arm 52 of the locking element 54 (FIGS. 3 and 12). The locking element 54 is pivotally connected at 56 to the camera housing.

The opposite arm 58 of the camming element 44 defines a pair of bearing members 60 and 62. The member 60 presses into engagement with the dog 64 which is pivotally attached to the housing at 66. The spring 68 has one end bearing against the post 70, and the other end bearing against the element 72 formed integrally with the dog. Accordingly, the pawl end 74 of the dog is normally urged toward the teeth of the ratchet 36.

The locking element 54 includes an end portion 76 which is provided for engagement with the shoulder 78 defined by the shutter lever plate 80. This plate is pivotally attached at 82, and the outwardly extending arm 84 of the plate carries a pin 86 which is received in the slot 88 defined by the vertical extension 90 of the shutter actuating button.

In FIG. 3, the operating elements are illustrated in a position with the shutter locked and with the film winding wheel free. Locking of the shutter is effected by the end portion 76 of the locking element, this portion being interposed in the path of the shoulder 78 of the plate 80. Thus, if the button 22 is pushed down, the plate 80 is restrained against pivoting movement because of the position of the portion 76 of the locking element.

With the film in the position shown in FIG. 3, continued rotation of the wheel 36 will move the perforation 34 opposite the finger 38. A small amount of additional rotation results in pivoting of the finger to the position shown in FIG. 8. A shoulder 92 defined at the base of the finger is thus released from engagement with the wall portion 94. This frees the finger for movement into the slot 96 defined by this wall portion.

With the finger free, the action of spring 68 pivots the dog 64 whereby the pawl 74 locks the wheel 36 against further rotation. Pivoting movement of the dog also results in pivoting of camming element 44 whereby the end 48 of the camming element forces the locking element 54 to pivot. This releases the tooth 78 of the plate 80 whereby the extension 90 of the shutter button can be moved.

When the shutter button is pushed downwardly, the plate 80 is pivoted to the position shown in FIG. 10. The drive element 98 of the plate engages the extension 62 of the camming element 44 which pivots the camming element and the dog 64 thereby removing the pawl 74 from engagement with the ratchet teeth. Pivoting movement of the camming element also withdraws the finger 38 from the perforation 34, and the spring 100 pulls the finger back to the position shown in FIG. 9. It will be noted that in this pivoted position, the arm 40 carrying the finger 38 is moved sufficiently so that the shoulder 92 at the base of the finger will lock into position relative to the wall 94.

The pivoting movement of the camming element 44 also releases the pressure of the portion 48 against the extension 50 of locking element 54. The spring 102 associated with the locking element tends to pivot the element; however, the end 76 is at this time pressing against the back side of the plate 80.

The plate 80 carries a shutter plate 104 which defines an opening 106. The lever plate 80 defines an opening 108, and when these openings are aligned with opening 109, exposure of the film will take place. A spring 110 has one end secured around the post which provides the pivot point 82, and this spring extends to the pivotal connection 112 provided between the lever plate and shutter plate and to the tab 114 which secures the spring on the shutter plate. When the push buton 22 is moved, there is relative movement between the lever plate and shutter plate due to engagement of the end 116 of the shutter plate with locking lever 118. The end 116 of the shutter plate eventually slides by the extension 120 on the locking lever, and the spring 110 then causes the shutter plate to move rapidly to the position shown in FIG. 11. The elements are arranged so that the openings 106, 108 and 109 will be in alignment at one point during this rapid movement of the shutter plate to provide for exposure.

When the shutter button is released, the spring 110, by reason of the engagement of spring extension 122 with the camera housing, will cause the plate 80 and associated plate 104 to return to its original position. At this time, the locking element extension 76 will snap into place relative to the tooth 78 to lock the plate 80 against pivotal movement. The finger 38 engages the film surface and will remain in this position until the wheel 36 is operated to bring the next frame and associated perforation into position. The engagement of the shoulder 92 with the wall 94 prevents the camming element 44 from pivoting in response to the spring 68. In this connection, the spring 68 is stronger than the spring 102 so that the former spring will cause the desired pivoting movement when the next perforation is reached.

The finger 38 extends beyond the cartridge wall 130 to insure engagement with a perforation. This causes a slight bend in the film, however, the film flattens when the picture is taken.

It will be understood that various changes and modifications may be made in the above described construction which provide the characteritsics of this invention without departing from the spirit thereof particularly as defined in the following claims.

That which is claimed is:

1. In a camera construction including a housing, a lens and shutter associated with the housing, a shutter actuating mechanism, means for supporting film within the housing behind the lens and shutter, said film comprising an elongated strip whereby a plurality of frames can be provided, perforations defined along the length of the film in positions corresponding to the frames, a winding wheel for moving said film, and sensing means engageable with said perforations to effect locking of said winding wheel and unlocking of the shutter as each frame is moved into position, the improvement comprising operating means interposed between said sensing means and said winding wheel and shutter, said operating means including a pivotally mounted camming element, a shutter locking element, a first camming surface on said camming element for driving said locking element from a locking to an unlocking position, a winding wheel locking element, a second camming surface on said camming element for moving said winding wheel locking element into and out of locking engagement with said winding wheel, said camming element having a starting position and a picture taking position, means connecting said sensing means and said camming element, said camming element pivoting from said starting position in driving engagement with said shutter locking element and said winding wheel locking element upon detection of a perforation by said sensing means to unlock said shutter and to lock said winding wheel when said sensing means detects a perforation, a third camming surface on said camming element, and a drive member movable by said shutter for engaging said third camming surface to pivot the camming element back to its starting position upon actuation of the shutter whereby the shutter will be locked and the winding wheel unlocked until the next perforation is detected by the sensing means.

2. A construction in accordance with claim 1 wherein said sensing means comprises a finger attached to said camming element, the end of said finger normally extending into the path of movement of said film whereby said end engages the surface of the film and presses the film outwardly from its normal position, said finger being pivotally mounted whereby receipt of the finger by a perforation causes the finger to move for a limited distance with the film, spring means normally urging the finger back to original position, and wherein movement of the camming element back to the starting position results in withdrawal of the finger from a perforation and restoring of the finger to its original position.

3. A construction in accordance with claim 2 including a wall portion of the camera adjacent the location of the finger, a shoulder associated with the finger and engaging a wall portion of the construction when the finger is in its original position, and wherein said shoulder is removed from engagement with said wall portion when said finger is received by a perforation.

4. A construction in accordance with claim 1 wherein said winding wheel defines ratchet teeth, and wherein said winding wheel locking element comprises a pivotally mounted dog defining a pawl for engaging said ratchet teeth.

5. A construction in accordance with claim 4 including a spring associated with said dog, said spring operating to force said pawl into engagement with said ratchet teeth and simultaneously operating to pivot said camming element when said sensing means detects a perforation.

6. A construction in accordance with claim 1 wherein said shutter locking element comprises a pivotally mounted member defining an outwardly extending portion at one end, the shutter arrangement of the construction including a shutter lever plate, a tooth defined by said shutter lever plate for engaging the extension of said locking element, and wherein pivoting movement of said camming element results in movement of said locking element to disengage said extension from said tooth.

7. A construction in accordance with claim 6 wherein said drive member is integral with said shutter lever plate, actuation of said shutter moving said drive member into engagement with said third camming surface to force the camming element back to its starting position, and wherein said sensing means comprises a finger adapted to be received in a perforation, the movement of said camming element imparted by said drive member causing said finger to be withdrawn from the perforation and at the same time causing said camming element to move said winding wheel locking element to free said winding wheel for rotation.

8. A construction in accordance with claim 7 including spring means attached to said shutter lever plate, said spring means operating to restore the shutter lever plate to its initial position upon completion of a picture taking operation 5 and wherein this return movement of the shutter lever plate repositions the extension on said locking element into engagement with said tooth.

References Cited

UNITED STATES PATENTS 3,148,605   9/1964   Peterson et al. _____ 242—71.4

FOREIGN PATENTS 992,223   2/1964   Great Britain _____ 95—31

SAMUEL S. MATTHEWS, Primary Examiner

R. E. ADAMS, Jr., Assistant Examiner

U.S. Cl. X.R.

95—11L, 31FL